US009867122B2

(12) United States Patent
Kim et al.

(10) Patent No.: US 9,867,122 B2
(45) Date of Patent: Jan. 9, 2018

(54) METHOD AND TERMINAL FOR DETERMINING ACCESS ON BASIS OF POLICY

(71) Applicant: LG ELECTRONICS INC., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 66 days.

(21) Appl. No.: 14/758,177

(22) PCT Filed: Feb. 19, 2014

(86) PCT No.: PCT/KR2014/001334

§ 371 (c)(1),
(2) Date: Jun. 26, 2015

(87) PCT Pub. No.: WO2014/129794

PCT Pub. Date: Aug. 28, 2014

(65) Prior Publication Data

US 2015/0334644 A1 Nov. 19, 2015

Related U.S. Application Data

(60) Provisional application No. 61/769,136, filed on Feb. 25, 2013.

(51) Int. Cl.
*H04W 48/14* (2009.01)
*H04W 72/04* (2009.01)
(Continued)

(52) U.S. Cl.
CPC ......... *H04W 48/14* (2013.01); *H04L 41/0893* (2013.01); *H04W 4/02* (2013.01);
(Continued)

(58) Field of Classification Search
CPC .. H04L 41/0893; H04W 8/082; H04W 48/12; H04W 48/14; H04W 48/16; H04W 48/17;
(Continued)

(56) References Cited

U.S. PATENT DOCUMENTS

2011/0085498 A1* 4/2011 Oba ...................... H04W 48/18 370/328
2011/0188376 A1* 8/2011 Stupar ................. H04L 12/5692 370/235

(Continued)

FOREIGN PATENT DOCUMENTS

FI WO 2013124715 A1 * 8/2013 ............ H04W 48/18
KR 10-2012-0123424 A 11/2012

(Continued)

OTHER PUBLICATIONS

S2-130125 "Solutions for Interaction between WLAN network selection and network-provided policies for WLAN selection"; Huawei et al.; SA WG2 Meeting #95, Prague, Czech Republic; Jan. 28-Feb. 1, 2013.*

(Continued)

*Primary Examiner* — Benjamin H Elliott, IV

(74) *Attorney, Agent, or Firm* — Birch, Stewart, Kolasch & Birch, LLP

(57) ABSTRACT

One embodiment of the present specification provides a method for determining access on the basis of a policy. The method for determining access can comprise the steps for: receiving a plurality of policies including wireless LAN (WLAN) selection rules from a plurality of access network discovery and selection functions (ANDSFs) in a plurality of (Continued)

public land mobile networks (PLMNs); selecting any one of the plurality of policies on the basis of preset location-related criteria; and determining whether traffic of a user is delivered to a 3GPP access or detoured to a WLAN access, according to WLAN selection rules of the selected policy.

9 Claims, 10 Drawing Sheets

(51) Int. Cl.

| | |
|---|---|
| ***H04W 4/02*** | (2009.01) |
| ***H04L 12/24*** | (2006.01) |
| ***H04W 48/18*** | (2009.01) |
| *H04W 84/04* | (2009.01) |
| *H04W 84/12* | (2009.01) |

(52) U.S. Cl.
CPC ....... *H04W 48/18* (2013.01); *H04W 72/0493* (2013.01); *H04W 84/042* (2013.01); *H04W 84/12* (2013.01)

(58) Field of Classification Search
CPC ............... H04W 48/18; H04W 74/002; H04W 74/0866; H04W 72/0493; H04W 4/02
See application file for complete search history.

(56) References Cited

U.S. PATENT DOCUMENTS

| | | | | |
|---|---|---|---|---|
| 2012/0079084 | A1* | 3/2012 | Forssell | H04W 8/18 709/221 |
| 2012/0309447 | A1* | 12/2012 | Mustajarvi | H04W 48/18 455/524 |
| 2013/0322365 | A1* | 12/2013 | Garcia Martin | H04L 41/0893 370/329 |
| 2014/0092886 | A1* | 4/2014 | Gupta | H04W 48/14 370/338 |
| 2014/0295913 | A1* | 10/2014 | Gupta | H04W 74/02 455/552.1 |
| 2015/0009976 | A1* | 1/2015 | Kekki | H04W 48/18 370/338 |
| 2015/0189547 | A1* | 7/2015 | Forssell | H04L 63/101 370/235 |
| 2015/0334644 | A1* | 11/2015 | Kim | H04W 48/18 370/329 |

FOREIGN PATENT DOCUMENTS

| | | | |
|---|---|---|---|
| WO | WO 2011/050835 | A1 | 5/2011 |
| WO | WO 2011/088406 | A1 | 7/2011 |
| WO | WO 2012/055769 | A1 | 5/2012 |
| WO | WO 2012/135467 | A1 | 10/2012 |
| WO | WO 2013/022219 | A1 | 2/2013 |

OTHER PUBLICATIONS

S2-130134 "WLAN network selection and ANDSF policy"; Samsung; SA WG2 Meeting #95, Prague, Czech Republic; Jan. 28-Feb. 1, 2013.*
S2-130165; "WLAN Network Selection Based and ANDSF"; Qualcomm et al.; SA WG2 Meeting #95, Prague, Czech Republic; Jan. 28-Feb. 1, 2013.*
S2-130318; "Enhanced ANDSF Policy for Intelligent WLAN Selection"; Motorola; SA WG2 Meeting #95, Prague, Czech Republic; Jan. 28-Feb. 1, 2013.*
S2-130517 "WLAN Selection Triggered by NADSF Rules"; Motorola et al.; SA WG2 Meeting #95, Prague, Czech Republic; Jan. 28-Feb. 1, 2013.*
TD S2-130572 "WLAN network selection and ANDSF policy"; Samsung; SA WG2 Meeting #95, Prague, Czech Republic; Jan. 28-Feb. 1, 2013.*
Motorola Mobility, "Applicability of ISRP to ANDSF MO," Change Request, 3GPP TSG CT WG1 Meeting #71, C1-111759, Tallinn (Estonia), May 9-13, 2011 (server date Apr. 29, 2011, downloaded by EPO on Apr. 29, 2011), 6 pages.
Motorola, "Handling of policies from H-ANDSF and V-ANDSF," 3GPP TSG SA WG2 Meeting #70, TD S2-090272, Jan. 12-16, 2009, Scottsdale, Phoenix, USA, pp. 1-5.

* cited by examiner

METHOD AND TERMINAL FOR DETERMINING ACCESS ON BASIS OF POLICY

CROSS REFERENCE TO RELATED APPLICATIONS

This application is the National Phase of PCT International Application No. PCT/KR2014/001334, filed on Feb. 19, 2014, which claims priority under 35 U.S.C. 119(e) to U.S. Provisional Application No. 61/769,136, filed on Feb. 25, 2013, all of which are hereby expressly incorporated by reference into the present application.

BACKGROUND OF THE INVENTION

Field of the Invention

The present invention relates to a method and terminal for determining an access based on a policy.

Related Art

In 3GPP in which technical standards for mobile communication systems are established, in order to handle 4th generation communication and several related thrums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP, SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios; and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the |

TABLE 1-continued

| Reference point | Description |
| --- | --- |
| | reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Meanwhile, recently, with an explosive increase in data, there is an increase in a congestion of a core network of a mobile communication operator. As a way of solving this problem, there is an attempt to offload data of a UE to a typical data communication network without having to via a core network. As such, according to the attempt to offload the data of the UE to the typical data communication network without having to via the core network, a technique such as IP flow mobility and seamless offload (IFOM), multi access PDN connectivity (MAPCON), etc., has been proposed to support a multiple radio access. The MAPCON technique is a technique of transmitting data by using each of a 3GPP access and a Wi-Fi access as a PDN connection. The IFOM technique is a technique of transmitting data by aggregating the 3GPP access and the Wi-Fi access as one PDN or P-GW.

FIG. 6*a* shows an example of an IFOM technique.

As shown in FIG. 6*a*, the IFOM provides an identical PDN connection simultaneously through different several accesses. The IFOM provides a seamless offload to a WLAN.

In addition, the IFOM provides a delivery of an IP flow of one identical PDN connection from one access to another access.

FIG. 6*b* shows an example of an MAPCON technique.

As shown in FIG. 6*b*, the MAPCON technique is to establish several PDN connections, simply, IP flows, to different APNs through different access systems.

According to the MAPCON technique, a UE 10 may generate a new PDN connection on an access which is not used previously. Alternatively, the UE 10 may generate a new PDN connection on one access selected from several accesses used previously. Alternatively, the UE 10 may move the entirety or part of all PDN connections, which have already been connected, to another access.

As described above, according to the technique capable of offloading a UE traffic to a wireless LAN, the core network of the mobile communication operator has become less congested.

However, when there are several accesses capable of offloading user's data, it is not easy to determine an optimal access. To solve this problem, the mobile communication operator has proposed to provide the UE with a policy capable of determining the optimal access.

However, if the UE is roamed to a network of another operator and thus receives a plurality of policies, which policy will be selected by the UE is not technically clear, which results in more confusions. In addition, due to the technical confusions, the UE has eventually become incapable of selecting any policy. Therefore, a user's traffic is transmitted to an operator's network as it is originally intended, which causes the same problem as in the conventional technique.

SUMMARY OF THE INVENTION

Accordingly, a disclosure of the present specification aims to provide a method capable of solving the aforementioned problem.

To achieve the aforementioned aim, one disclosure of the present specification provides a method for determining an access based on policy. The method may comprise: receiving a plurality of policies including a wireless local area network (WLAN) selection rule from a plurality of access network discovery and selection functions (ANDSFs) at a plurality of public land mobile network (PLMNs); selecting a policy among the plurality of the policies based on a predetermined location-relevant criteria; and determining whether to deliver a user's traffic to 3GPP access or offload the user's traffic on a WLAN access according to the selected policy.

The predetermined location-relevant criteria may classify a home PLMN (H-PLMN) and a visited PLMN (V-PLMN).

The predetermined location-relevant criteria may be related to whether or not a policy provided from an ANDSF of H-PLMN is prioritized.

Whether or not the policy provided from the ANDSF of H-PLMN is prioritized may be identified based on information on V-PLMN where a policy is preferred.

The selecting step may include: determining priorities among the plurality of policies; and selecting the policy having a highest priority among the priorities of the plurality of policies.

The selecting step may include: if the policy provided from the ANDSF of the H-PLMN is prioritized, checking a WLAN selection rule included in the policy provided from the ANDSF of the H-PLMN; determining whether there is an available WLAN which matches a criteria in the WLAN selection rule; if there is the available WLAN which matches the criteria in the WLAN selection rule, determining to select the policy provided from the ANDSF of the H-PLMN; and if there is not the available WLAN which matches the criteria in the WLAN selection rule, determining to select the policy provided from the ANDSF of the V-PLMN.

The selecting step may include: if the policy provided from the ANDSF of the V-PLMN is prioritized, checking a WLAN selection rule included in the policy provided from the ANDSF of the V-PLMN; determining whether there is an available WLAN which matches a criteria in the WLAN selection rule; if there is the available WLAN which matches the criteria in the WLAN selection rule, determining to select the policy provided from the ANDSF of the V-PLMN; and if there is not the available WLAN which matches the criteria in the WLAN selection rule, determining to select the policy provided from the ANDSF of the H-PLMN.

The selecting step may be re-performed at predetermined time intervals. The selecting step may be re-performed when the policy is updated or a new policy is received.

Meanwhile, to achieve the aforementioned aim, one disclosure of the present specification provides a terminal for determining an access based on policy. The terminal may comprise: a reception unit configured to receive a plurality of policies including a wireless local area network (WLAN) selection rule from a plurality of access network discovery and selection functions (ANDSFs) at a plurality of public land mobile network (PLMNs); and a controller configured to select a policy among the plurality of the policies based on a predetermined location-relevant criteria and determine whether to deliver a user's traffic to 3GPP access or offload the user's traffic on a WLAN access according to the selected policy.

According to a disclosure of the present specification, when a user equipment (UE) has a plurality of policies from access network discovery and selection functions (ANDSFs) of a plurality of Public Land Mobile Network (PLMN), one appropriate policy can be selected, thereby solving the aforementioned problem of the conventional technique.

DESCRIPTION OF EXEMPLARY EMBODIMENTS

Figure 1:
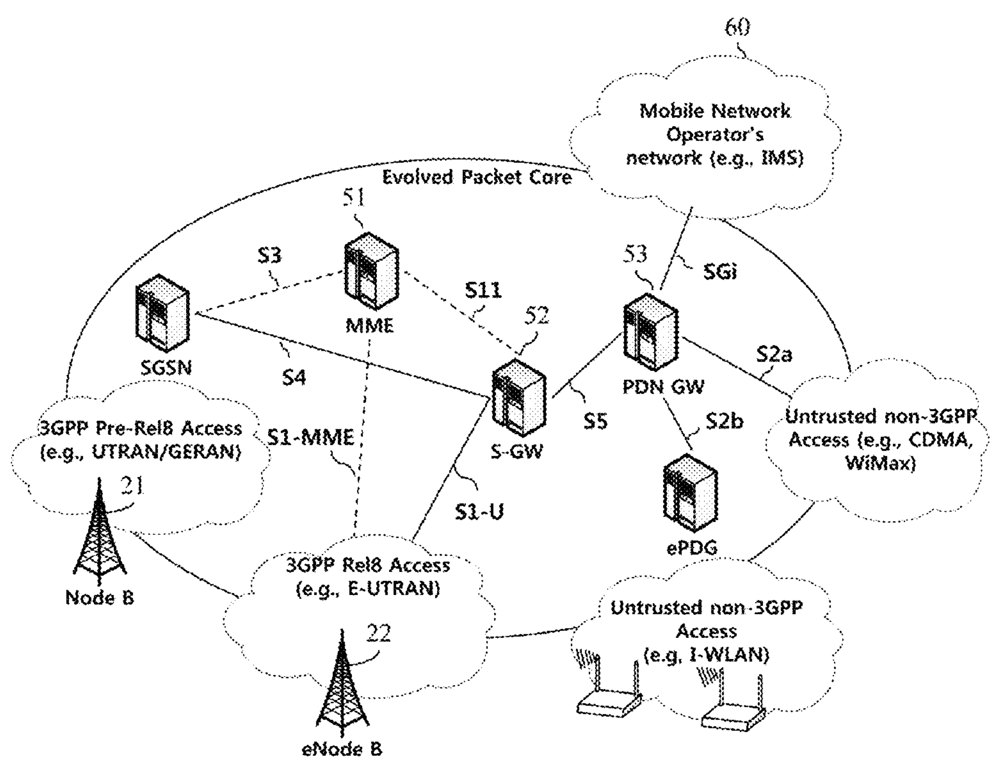
FIG. 1 shows the configuration of an evolved mobile communication network.
Figure 2:
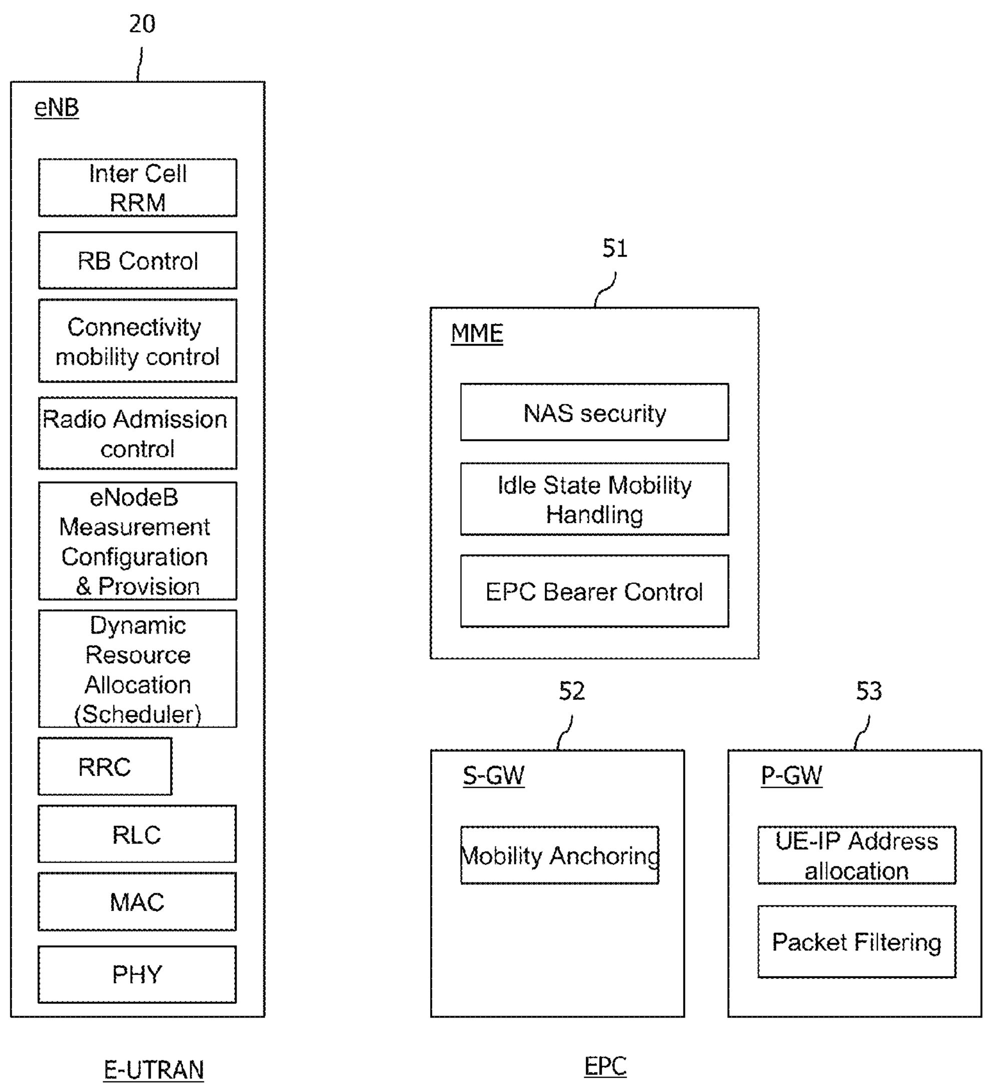
FIG. 2 is an exemplary diagram showing the architecture of a common E-UTRAN and a common EPC.
Figure 3:
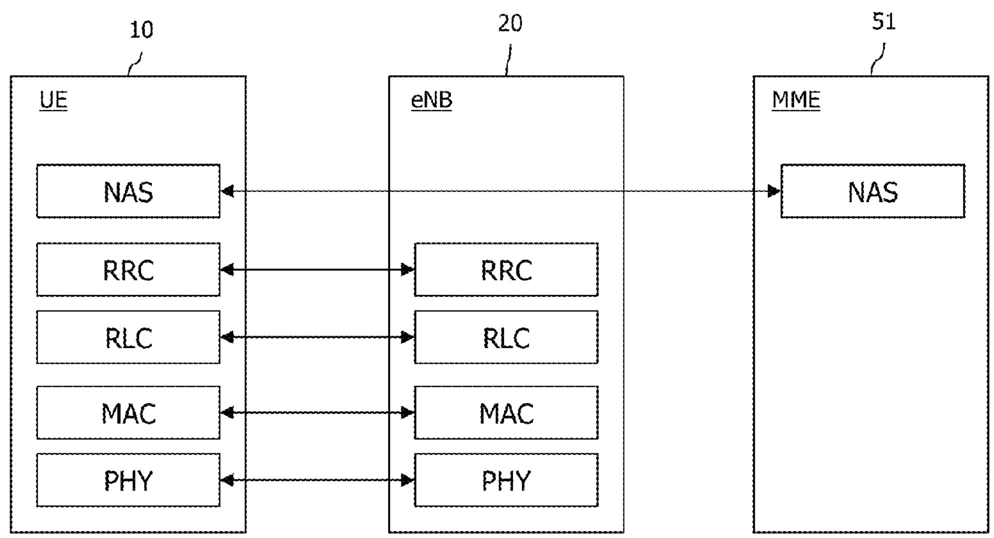
FIG. 3 is an exemplary diagram showing the structure of a radio interface protocol in a control plane between UE and an eNodeB.
Figure 4:
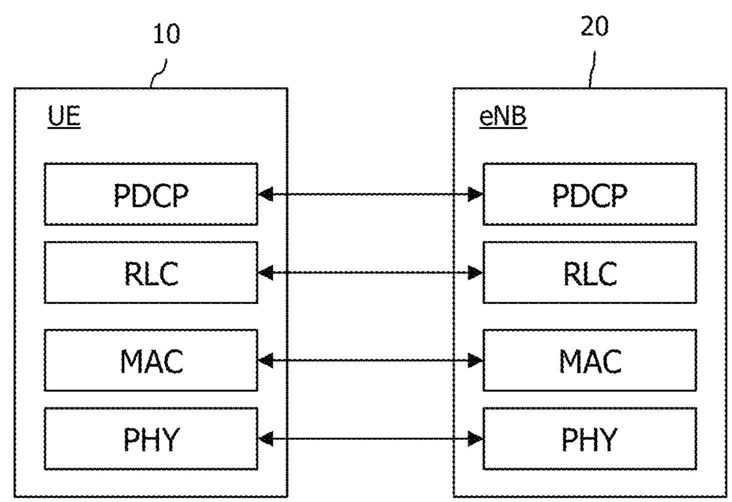
FIG. 4 is another exemplary diagram showing the structure of a radio interface protocol in a control plane between UE and an eNodeB.
Figure 5:
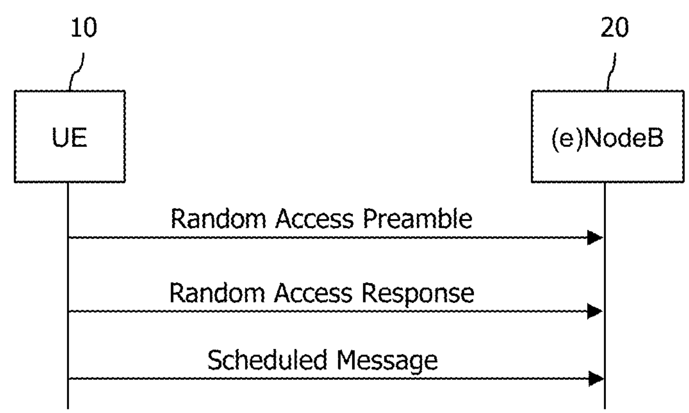
FIG. 5 is a flowchart illustrating a random access process in 3GPP LTE.
Figure 6A:
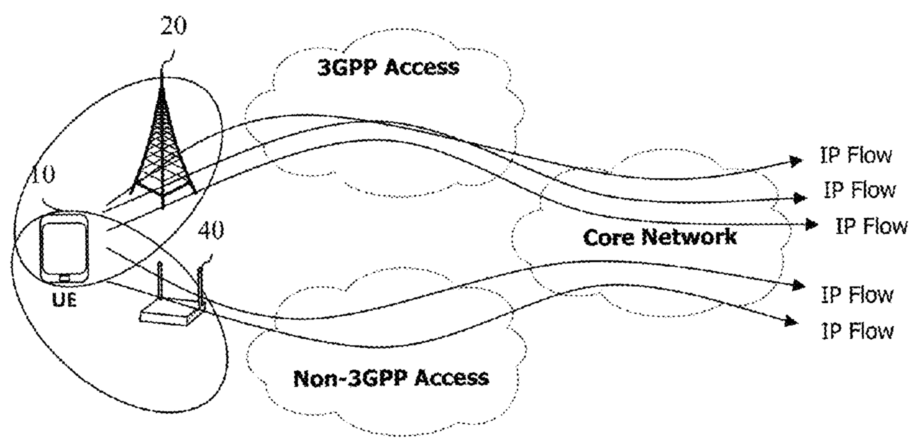
FIG. 6*a* shows an example of an IFOM technique.
Figure 6B:
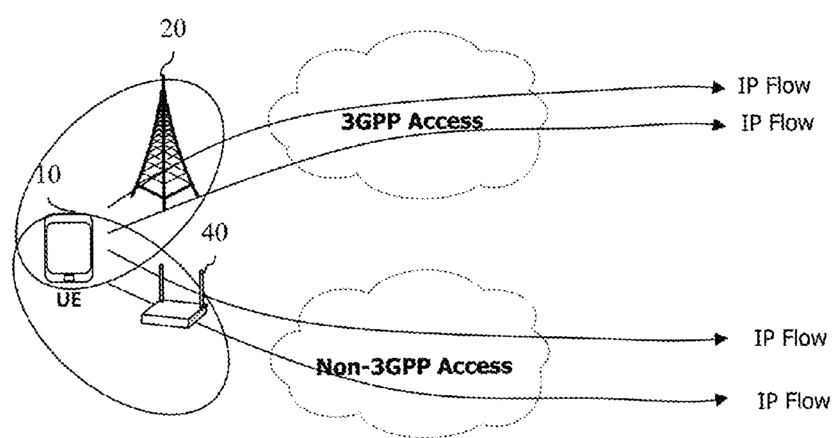
FIG. 6*b* shows an example of an MAPCON technique.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

NAS (Non-Access-Stratum): A higher stratum of a control plane between a UE and an MME. The NAS supports mobility management, session management, IP address management, etc., between the UE and the network.

RAT: It is an acronym of Radio Access Technology, and implies GERAN, UTRAN, E-UTRAN, etc.

WORM: It is an acronym of WLAN (Wireless LAN) Offloading RAT Mobility, and implies a technique of offloading specific data traffic to a WLAN according to an operator's preference policy. That is, in a state where an operator's preference is set to 'E-UTRAN>WLAN>UTRAN', if an RAT is changed according to a handover from E-UTRAN to UTRAN, some data traffics influenced by the handover may be offloaded to the WLAN.

Meanwhile, the following description is made with reference to the accompany drawings.

Figure 7A:
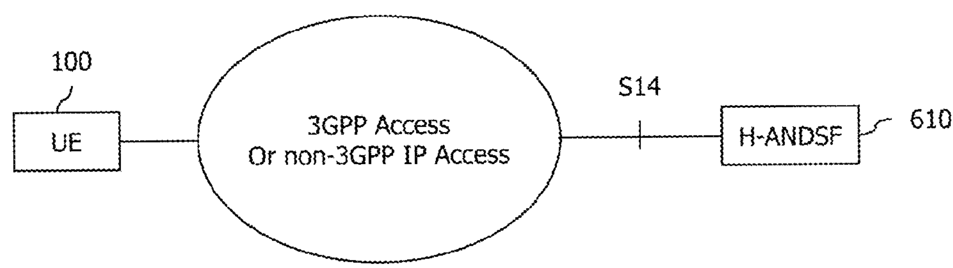
FIG. 7*a* and FIG. 7*b* show a network control entity for selecting an access network.
Figure 7B:
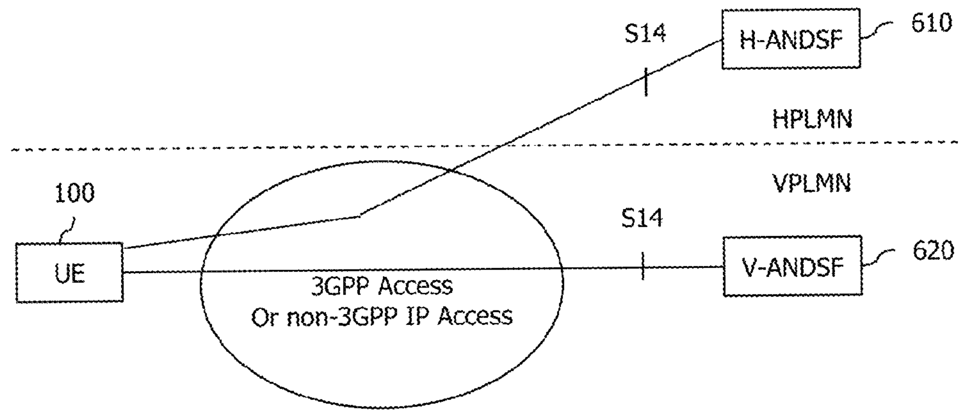

FIG. 7*a* and FIG. 7*b* show a network control entity for selecting an access network.

An operator may provide a UE 100 with a policy related to traffic offloading. The UE 100 may offload its data not to an access network of the operator but to another access, e.g., a wireless LAN, according to the policy.

For provisioning of such a policy to the UE 100, an access network discovery and selection function (ADNSF) based on 3GPP is improved to be able to provide a policy related to a wireless LAN.

As shown in FIG. 7*a*, the ANDSF may exist in a home public land mobile network (HPLMN) of the UE 100. Further, as shown in FIG. 7*b*, the ANDSF may also exist in a visited public land mobile network (VPLMN) of the UE 100. As such, an ANDSF located in the HPLMN may be called an H-ADNSF 610, and an ANDSF located in the VPLMN may be called a V-ANDSF 620. Hereinafter, the term ADNSF is used to refer to both the H-ANDSF 610 and the V-ANDSF 620.

The ANDSF may provide information regarding an inter-system movement policy, information for discovering an access network, and information regarding inter-system routing, e.g., a routing rule.

Meanwhile, an improved technique of selecting a WLAN network for a dual mode UE supporting a cellular access network and a WLAN (WiFi) access network (in particular, Hotspot 2.0) is under research in 3GPP release 12, and is named as WLAN NS (WLAN Network Selection for 3GPP Terminals).

Figure 8A:
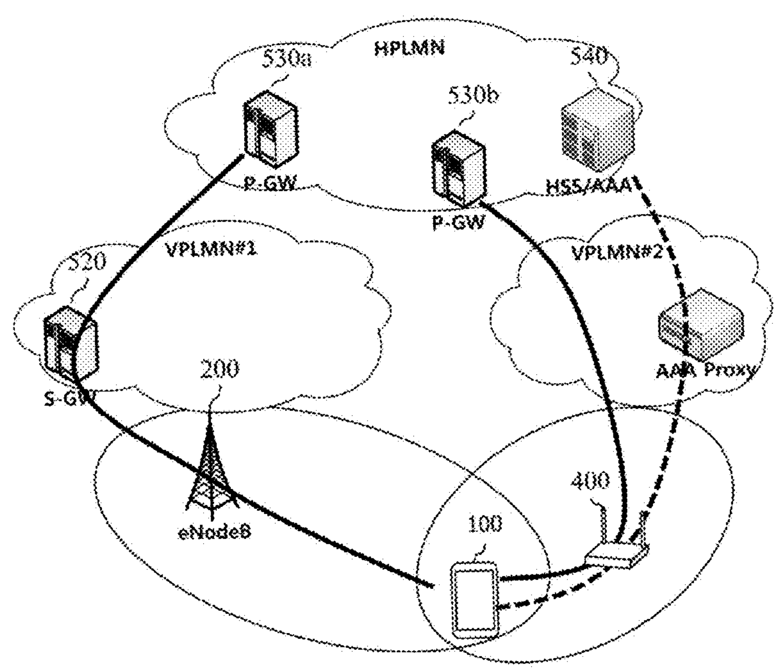
FIG. 8*a* shows an example of a technical problem which may occur in a roaming situation.
Figure 8B:
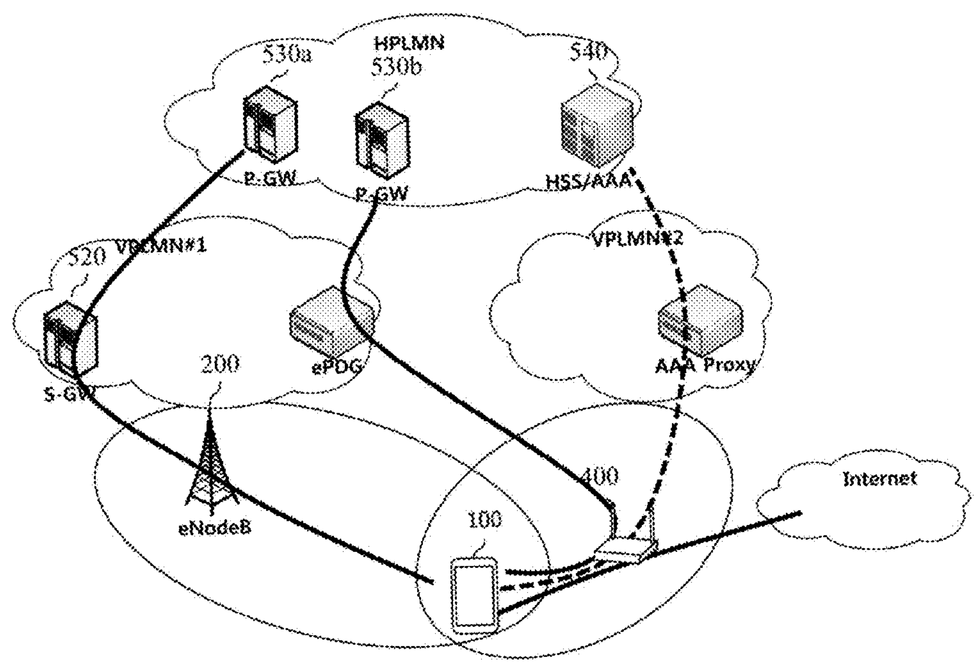
FIG. 8*b* shows an example of another technical problem which may occur in the roaming situation.

On the other hand, as shown in FIG. 8*a* and FIG. 8*b*, several issues and solutions for the issues are proposed in 3GPP.

FIG. 8*a* shows an example of a technical problem which may occur in a roaming situation, and FIG. 8*b* shows an example of another technical problem which may occur in the roaming situation.

In the example of FIG. 8*a*, a UE 100 selects different VPLMNs in a 3GPP access and a WLAN access. That is, as shown in FIG. 8*a*, the UE 100 is connected to an HPLMN via a VPLMN#1 through an eNodeB 200 based on a 3GPP access, and is connected to an HPLMN via a VPLMN#2 through a WLAN AP 400 based on non-3GPP access. That is, if the UE 100 is simultaneously connected to the 3GPP access and the WLAN access, it is connected to the two accesses by selecting different VPLMNs. Such a situation may occur when the UE 100 is connected to both the 3GPP access and the WLAN access, and a PLMN selection procedure is performed on each of the different VPLMNs. This is because, if the PLMN selection is performed in the 3GPP access, the network and PLMN selection in the WLAN is performed independently. That is, the network selection procedure is performed completely irrelevant to a result of the PLMN selection.

Meanwhile, the example of FIG. 8*b* shows a situation in which a VPLMN is different in the 3GPP access and the WLAN access and a situation in which ePDG is selected in the 3GPP VPLMN. Such a situation may occur in a case where a UE is first connected to 3GPP and is subsequently connected to WLAN, and discovers the ePDG in the 3GPP VPLMN.

In case of selecting the ePDG as such, any one of the following scenarios may occur.

- When a UE is connected to a VPLMN of a 3GPP access, the UE may discover an ePDG in the VPLMN used in the 3GPP access or an ePDG in an HPLMN.
- When the UE has an access to an HPLMN of the 3GPP access, the UE may discover an ePDG of the HPLMN.
- When the UE is not connected to the 3GPP access, the UE may discover an ePDG in a PLMN selected in a WLAN or an ePDG in an HPLMN.

As described above with reference to FIG. 8*a* and FIG. 8*b*, a situation in which a plurality of serving PLMNs co-exist is not fully considered technically in 3GPP. If a UE is roamed in such a situation, several problems may occur.

Eventually, due to not only the aforementioned reason but also several other reasons, there is a need to provide an obvious technique regarding a use of a V-ANDSF and regarding scenarios in which a UE is served by several VPLMNs in a 3GPP access and a WLAN access.

In order to solve the problem shown in FIG. 8*a* and FIG. 8*b*, the following solution was considered in 3GPP.

1. First Solution: A Policy Regarding Simultaneous Connectivity to Several V-PLMNs.

An ANDSF may provide a policy regarding a broad criterion which can be used to determine to which access a UE is connected.

A V-ANDSF may provide an access network selection policy capable of detecting an optimal access network related to a specific V-PLMN. This implies that a V-ADNSF server of a specific operator can provide the policy also to a UE belonging to a vender Y. When there is an overlap or a collision between policies from a V-ADNSF and an H-ANDSF, the UE is allowed to adjust the policies.

However, if the UE is connected simultaneously to the VPLMN in the 3GPP access and the VPLMN in the WLAN access and thus receives several policies simultaneously from the plurality of V-ANDSFs as described above, the UE must first determine to which V-ANDSF a policy to be used belongs. Since this is impossible, the aforementioned solution is not helpful.

In order to solve this problem, a 3GPP system may improve V-ANDSF policies to consider a case where an access is made via the same V-PLMN through a 3GPP access and a non-3GPP access. However, although the UE can use policies of all V-ANDSFs as to an access of a V-PLMN#1 in this manner in the situation shown in FIG. 8*b*, there is a problem in that the UE cannot use a V-ANDSF of the V-PLMN#1 or V-PLMN#2 in the situation shown in FIG. 8*a*. That is, the UE can use a policy from the V-ANDSF only when there is only one selected V-PLMN as to all connected accesses.

2. Second Solution: Selecting of WLAN Based on ANDSF Rule.

This solution relates to a method in which a UE selects a WLAN access on the basis of a preference included in an activated inter-system mobility policy (ISMP)/inter-system routing policy (ISRP). Such a solution has the following characteristics.

The UE selects or reselects a WLAN according to the provided ISMP/ISRP. A procedure of selecting/reselecting the WLAN may be triggered when the ISMP/ISRP is activated.

However, there is a problem in that this solution cannot be used since a method of determining the activation of the ISMP/ISRP by the UE has not be completely solved technically.

3. Procedure of Selecting Improved I-WLAN Based on ANDSF.

This solution relates to a WLAN network selection and an interaction between policies provided by a network for the selection. According to this solution, the WLAN selection is performed by an I-WLAN selection and PLMN selection procedure. Herein, the I-WLAN selection is used to support the PLMN selection procedure. More specifically, according to the I-WLAN selection procedure, a UE scans WSIDs on a list stored in a SIM/USIM card, and performs a PLMN selection procedure for each WSID. Thereafter, if a proper PLMN is discovered, the UE stops the scanning.

However, this solution has a technical difficulty as to how to extract the lists of the WLAN from the activated ANDSF. As described above, there is a problem in that this solution cannot be used since a method of determining the activation of the ISMP/ISRP by the UE has not be completely solved technically.

On the other hand, the following method can be considered to cope with a situation in which a plurality of policies are received from an ANDSF.

1. In Case of ISMP.

If there are a plurality of ISMPs, a UE uses only one ISMP at a time. An ISMP of a registered PLMN (RPLMN) is prioritized as much as possible. For example, if the UE is roamed, an ISMP from a V-ANDSF of the RPLMN is prioritized as much as possible as to an ISMP from an H-ADNSF.

2. In Case of ISRP.

A UE configured to be capable of offloading an IFOM, an MAPCON, or a non-seam less WLAN may use an ISRP. However, a UE which does not have a corresponding function may ignore the ISRP. Further, a UE configured for the corresponding function may not apply the ISRP if the function is disabled at a specific time point.

The UE configured to be capable of offloading the IFOM, the MAPCON, or the non-seamless WLAN may use the followings for the ISRP.

- To perform routing on a traffic of a user plane which matches a specific or any APN designated in the ISRP, the ISRP may be used to select an access technology or an access network or both of them.
- The ISRP may be used to determine whether a specific access technology or an access network or both of them is restricted for a specific IP flow on a specific or any APN designated in the ISRP.

A UE capable of performing IFOM may identify an access network or an access technology capable of performing routing on an IP flow on the basis of the ISRP. The UE may perform an IFOM procedure to move an ongoing IP flow from a source access technology or access network to the identified access technology or access network.

If there are a plurality of ISMPs, a UE uses only one ISMP at a time. An ISMP of a registered PLMN (RPLMN) is prioritized as much as possible. For example, if the UE is roamed, an ISMP from a V-ANDSF of the RPLMN is prioritized as much as possible as to an ISMP from an H-ADNSF.

However, the aforementioned method for the ISMP/ISRP is not effective since the ISMP/ISRP received by the UE through the WLAN is not taken into consideration.

In conclusion, if the UE is connected simultaneously to several PLMNs, there is a technically unsolved problem regarding from which ADNSF a policy to be used is received.

In addition, if the UE receives several types of policies such as an ISMP/ISRP and an enhanced ISMP/ISRP, there is a technically unsolved problem regarding which one is to be used. That is, if the conventional technique is directly applied, it may be difficult to select an optimal WLAN or to effectively offload data.

Accordingly, solutions of the present invention for solving the aforementioned problem are proposed hereinafter.

<Brief Description on Solution Proposed in this Specification>

According to an exemplary embodiment proposed in the present specification, if there are a plurality of policies, a UE may select a policy to be activated or applied on the basis of a specific parameter or specific factor or element predetermined when a roaming agreement is made between an HPLMN and a VPLMN.

Such a specific parameter or a specific factor or element may be predetermined in the UE, or may be received by the UE through additional signaling from the HPLMN/VPLMN, or may be received together when another policy is received.

Alternatively, the UE may optionally request and receive the specific parameter or the specific factor or element.

In other words, an activated ISMP/ISRP rule and an activated WLANSP rule may be selected as follows on the basis of a UE configuration. The UE is configured to prefer (prioritize) a WLAN selection rule received from an HPLMN. This may be configured by a user or may be configured by an H-ANDSF through a list of "VPLMNs with preferred WLAN Selection Rules". In this case, a configuration of a user may be prioritized over a configuration of the H-ANDSF.

Figure 9A:
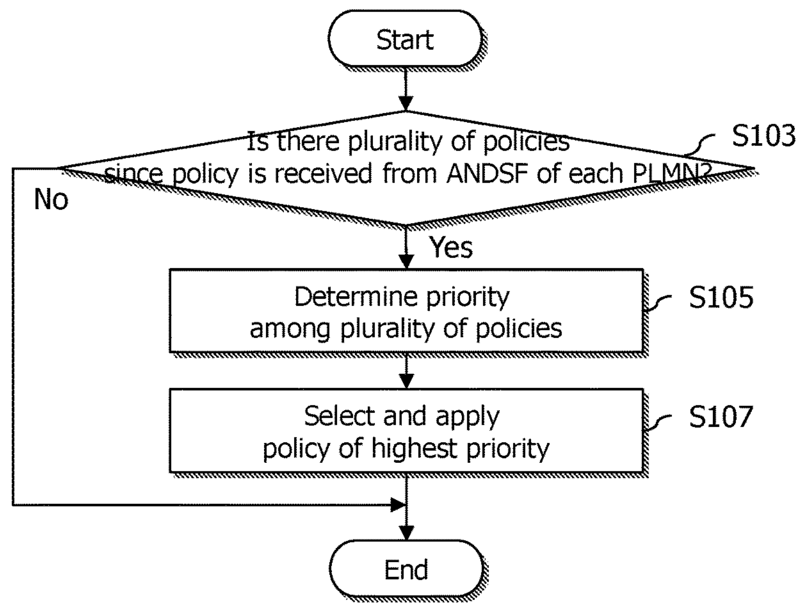
FIG. 9*a* is a flowchart showing a solution according to an embodiment of the present specification.
Figure 9B:
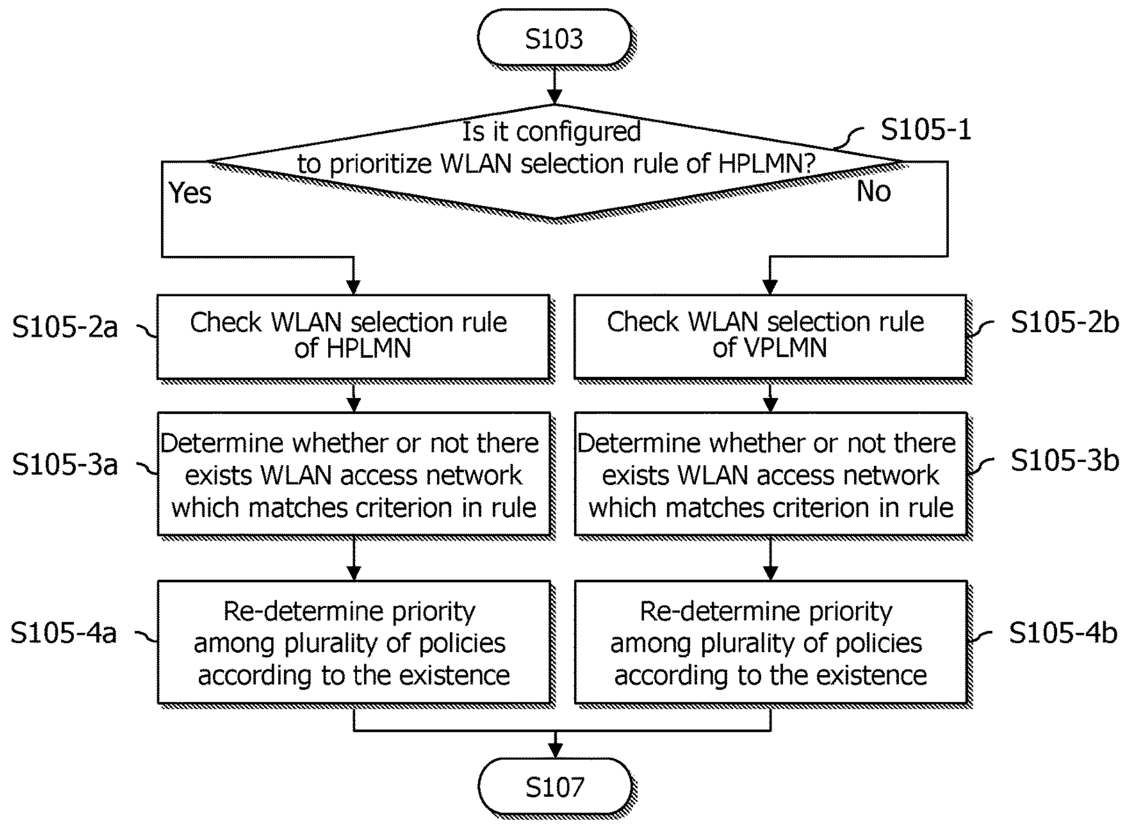
FIG. 9*b* is a flowchart showing a priority determining process (S105) shown in FIG. 9*a* in detail.

FIG. 9*a* is a flowchart showing a solution according to an embodiment of the present specification, and FIG. 9*b* is a flowchart showing a priority determining process (S105) shown in FIG. 9*a* in detail.

As shown in FIG. 9*a*, it is determined whether there is a plurality of policies since the UE 100 receives each policy from an ANDSF of several PLMNs (S103). Taking the situation of FIG. 8*a* for example, the UE 100 may have three policies, that is, a policy received from an ANDSF of an HPLMN, a policy received from an ANDSF of a VPLMN#1, and a policy received from an ANDSF of a VPLMN#2.

In case of having the plurality of policies as described above, the UE 100 determines priorities among the plurality of policies on the basis of a specific parameter or a specific factor or a specific element (S105). For such a determination, the UE 100 may first determine a specific parameter or a specific factor or element to be used. The number of specific parameters or specific factors or elements may be plural in number. As the specific parameter (or factor or element), a parameter related to a location (i.e., geographical area) (e.g., HPLMN or VPLMN) may be used. For example, the parameter may be "prefer WLAN selection rules provided by the HPLMN".

The priority determining process (S105) will be described below in detail with reference to FIG. 9*b*.

The UE 100 determines which PLMN's policy, of which a WLAN selection rule is prioritized, is configured on the basis of the specific parameter or the specific factor or element (S105-1). For example, if a parameter related to a location (e.g., HPLMN or VPLMN) is used as the specific parameter (or factor or element) and the location-related parameter is "prefer WLAN selection rules provided by the HPLMN", the UE 100 determines whether it is configured such that a WLAN selection rule of the HPLMN is prioritized.

If it is configured such that the WLAN selection rule of the HPLMN is prioritized, the UE 100 checks the WLAN selection rule of the HPLMN (S105-2*a*). For example, if the parameter "prefer WLAN selection rules provided by the HPLMN" is configured and thus the WLAN selection rule of the HPLMN is prioritized (i.e., if a VPLMN to which the UE is registered does not correspond to VPLMNs with preferred WLAN selection rule), the UE 100 may check the WLAN selection of the HPLMN. More specifically, for example, if the UE 100 is registered to the VPLMN#1 at present but the VPLMN#2 or the VPLMN#3 is preferred according to the VPLMNs with preferred WLAN selection rule, the UE 100 checks the WLAN selection rule of the HPLMN since the VPLMN#1 to which the UE 100 is irrelevant.

Subsequently, the UE 100 determines whether or not there is an available WLAN access network which matches a criterion in the WLAN selection rule of the HPLMN (S105-3*a*).

Subsequently, a priority is re-determined among the plurality of policies according to whether or not there is the available WLAN access network (S150-4*a*). More specifically, if there is the WLAN access network which matches the criterion in the WLAN selection rule of the HPLMN, the UE 100 selects a WLAN selection rule of a HPLMN and an ISMP/ISRP rule of the HPLMN with a highest priority. However, if there is no WLAN access network which matches the criterion in the WLAN selection rule of the HPLMN, the UE 100 may select a WLAN selection rule of a VPLMN and an ISMP/ISRP rule of the VPLMN with a highest priority. For example, if there is the WLAN access network which matches the criterion in the WLAN selection rule of the HPLMN, the HPLMN is first prioritized, and the VPLMN #1 is second prioritized.

Meanwhile, if it is not configured such that a WLAN selection rule of the HPLMN is prioritized, the UE 100 checks the WLAN selection rule of the VPLMN (S105-2*b*). For example, if the parameter "prefer WLAN selection rules provided by the HPLMN" is not configured and thus the WLAN selection rule of the VPLMN is prioritized (i.e., if a VPLMN to which the UE is registered corresponds to VPLMNs with preferred WLAN selection rules), the UE 100 checks the WLAN selection rule of the VPLMN. More specifically, if the UE 100 is in a state of being currently registered to the VPLMN#2 and if the VPLMN#2 or the VPLMN#3 are preferred by VPLMNs with preferred WLAN selection rules, the UE 100 checks a WLAN reselection rule of the VPLMN#2.

Subsequently, the UE 100 determines whether or not there is an available WLAN access network which matches a criterion in the WLAN selection rule of the VPLMN (S105-3*b*).

Subsequently, a priority is re-determined among the plurality of policies according to whether or not there is the available WLAN access network (S150-4*a*). For example, if there is the WLAN access network which matches the criterion in the WLAN selection rule of the VPLMN, the UE 100 selects a WLAN selection rule of a VPLMN and an ISMP/ISRP rule of the VPLMN with a highest priority. However, if there is no WLAN access network which matches the criterion in the WLAN selection rule of the VPLMN, the UE 100 may select a WLAN selection rule of an HPLMN and an ISMP/ISRP rule of the HPLMN with a highest priority. For example, if there is the WLAN access network which matches the criterion in the WLAN selection rule of the VPLMN#2, the VPLMN#2 is first prioritized, and the HPLMN is second prioritized.

Referring back to FIG. 9*a*, the UE 100 selects and applies a policy having a highest priority (S107).

The priority determining process (S105) and the selecting/applying process (S107) may be performed repetitively according to a specific time. Alternatively, when a new policy is received or when it is recognized that the old policy is updated, the priority determining process (S105) and the selecting/applying process (S107) may be performed again.

<Example of Applying Solution Proposed in this Specification>

First, the following description is made by applying a solution proposed in the present specification to the situation of FIG. 8*a*.

As shown in FIG. 8*a*, the UE 100 is connected to an HPLMN via a VPLMN#1 through an eNodeB 200 based on a 3GPP access, and is connected to an HPLMN via a VPLMN#2 through a WLAN AP 400 based on non-3GPP access. Therefore, the determining process (S101) of FIG. 9*a* results in 'True'.

Further, as shown in FIG. 8*a*, since the UE 100 has a plurality of policies by receiving a policy from each ANDSF of an HPLMN, a VPLMN#1, and a VPLMN#2, the determining process (S103) of FIG. 9*a* results in 'True'.

Therefore, the priority determining process (S105) is performed among the plurality of policies shown in FIG. 9*a*. Herein, in case of operators of the VPLMN#1 and the VPLMN#2, this is ineffective because, although there is a policy for offloading a traffic of the UE 100, which is roamed from the HPLMN, to a WLAN at a specific time and at a specific location, if the UE 100 does not perform the priority determining process (S105) but simply considers only a policy of the HPLMN, the traffic of the UE 100 cannot be offloaded to the WLAN. Therefore, the priority determining process (S105) among the plurality of policies is very important.

By reference, in the example of FIG. 8*a*, in a case where a roaming agreement or a preliminary agreement is made between an operator of the VPLMN#1 and the VPLMN#2 and an operator of the HPLMN, it is assumed that it is determined to use a parameter related to a location (i.e., geographical area) (e.g., HPLMN or VPLMN) as a specific parameter (or factor or element) to be used when determining a priority among a plurality of policies. Herein, the parameter may be "prefer WLAN selection rules provided by the HPLMN". Then, the UE 100 determines whether the parameter "prefer WLAN selection rules provided by the HPLMN" is configured and thus a WLAN selection rule of the HPLMN is prioritized or whether the parameter is not configured and thus a WLAN selection rule of the VPLMN is prioritized (S105-1). If the determination result shows that the WLAN selection rule of the VPLMN is preferred, the UE 100 checks the WLAN selection rule of the VPLMN (S105-2*b*). According to whether there is an available WLAN which matches a criteria in the WLAN selection rule of the VPLMN (S105-3*b*), the priority of the plurality of policies is re-determined (S105-4*b*).

Meanwhile, in a case where a roaming agreement or a preliminary agreement is made between an operator of the VPLMN#1 and the VPLMN#2 and an operator of the HPLMN, parameters related to Hotspot 2.0 may be determined. Herein, the parameters may be an organized unique identifier (OUI), a venue, etc. Then, the UE 100 may select a PLMN policy having a rule related to a specific OUI and a venue value on the basis of several pieces of network information received from the AP 400 at a current time point. For example, if a policy received from the HPLMN does not have a detailed rule for the OUI and the venue, whereas a policy received from the VPLMN#1 has such a detailed rule, then the UE can select/apply a policy received from the VPLMN#1. Alternatively, if conditions are in conflict with each other even if both of the OUI and the venue are included in the policy of the HPLMN and the VPLMN#2, the UE may select the policy on the basis of a predetermined specific value or a range of the value. In this example, the aforementioned parameters related to Hotspot 2.0, e.g., the OUI and the venue, are for exemplary purposes only, and thus the present invention is not limited thereto. A priority may exist among several factors, or the factors may operate in several combinations.

Next, the following description is made by applying a solution proposed in the present specification to the situation of FIG. 8*b*.

As shown in FIG. 8*b*, the UE 100 is connected to a VPLMN#1 through a 3GPP access, and is connected to the VPLMN#1 and a VPLMN#2 through a WLAN access. Therefore, the determining process (S101) of FIG. 9*a* results in 'True'.

Further, as shown in FIG. 8*b*, since the UE 100 has a plurality of policies by receiving a policy from each ANDSF of an HPLMN, a VPLMN#1, and a VPLMN#2, the determining process (S103) of FIG. 9*a* results in 'True'.

Therefore, the priority determining process (S105) is performed among a plurality of policies shown in FIG. 9*a*. A policy of the VPLMN#2 may be selected and applied according to the priority determining process (S105). However, if a traffic of the UE 100 is transmitted actually via the VPLMN#1 even if the policy of the VPLMN#2 is selected and applied, as a follow-up measure, a procedure of moving a UE traffic transmitted via a 3GPP access and a UE traffic transmitted via an ePDG to the VPLMN#2 may be performed subsequently.

The content described up to now can be implemented in hardware. This will be described with reference to FIG. 10.

Figure 10:
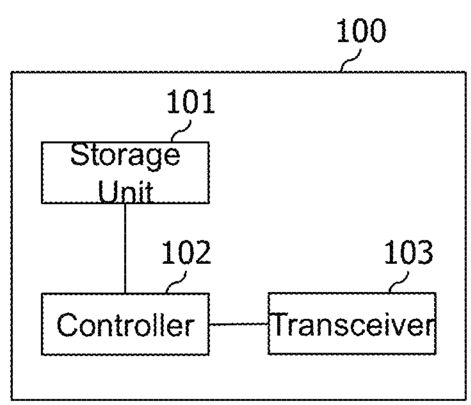
FIG. 10 is a block diagram of a UE 100 according to an embodiment of the present invention.

FIG. 10 is a block diagram of a UE 100 according to an embodiment of the present invention.

As shown in FIG. 10, the UE 100 includes a storage means 101, a controller 102, and a transceiver 103.

The storage means 101 stores the aforementioned methods.

The controller 102 controls the storage means 101 and the transacted 103. More specifically, the controller 102 executes each of the aforementioned methods stored in the storage means 101. The controller 102 transmits the aforementioned signals via the transacted 103.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for determining an access based on policy, the method comprising:

receiving, by a user equipment (UE), a plurality of policies including a wireless local area network (WLAN) selection rule from a plurality of access network discovery and selection functions (ANDSFs) at a plurality of public land mobile networks (PLMNs);

receiving, by the UE, a PLMN-based selection parameter from at least one PLMN of the plurality of PLMNs;

selecting, by the UE, a policy among the plurality of policies based on the PLMN-based selection parameter when there is no user configuration, wherein, when there is a user configuration, the user configuration takes a precedence over the PLMN-based selection parameter;

wherein the selected policy is used to select a WLAN access, wherein the plurality of PLMNs include a home PLMN (H-PLMN) and a visited PLMN (V-PLMN), and wherein the selecting of the policy includes:

when a policy provided by an ANDSF of the H-PLMN is prioritized, determining whether or not an available WLAN matches a criteria in the WLAN selection rule;

when the available WLAN matches the criteria in the WLAN selection rule, determining to select the policy provided by the ANDSF of the H-PLMN; and when the available WLAN does not match the criteria in the WLAN selection rule, determining to select the policy provided by an ANDSF of the V-PLMN.

2. The method of claim 1, wherein the PLMN-based selection parameter is related to whether or not the policy provided by the ANDSF of the H-PLMN is prioritized.

3. The method of claim 1, further comprising:

determining priorities among the plurality of policies, wherein the selected policy has a highest priority among the priorities of the plurality of policies.

4. The method of claim 1, wherein the selecting of the policy further includes:

when a policy provided by the ANDSF of the V-PLMN is prioritized, determining whether or not an available WLAN matches a criteria in the WLAN selection rule;

when the available WLAN matches the criteria in the WLAN selection rule, determining to select the policy provided from the ANDSF of the V-PLMN; and when the available WLAN does not match the criteria in the WLAN selection rule, determining to select the policy provided by the ANDSF of the H-PLMN.

5. The method of claim 1, wherein the selecting step is re-performed at predetermined time intervals.

6. The method of claim 1, wherein the selecting step is re-performed when the policy is updated or a new policy is received.

7. A terminal for determining an access based on policy, the terminal comprising:

a reception unit configured to:

receive a plurality of policies including a wireless local area network (WLAN) selection rule from a plurality of access network discovery and selection functions (ANDSFs) at a plurality of public land mobile networks (PLMNs), and receive a PLMN-based selection parameter from at least one PLMN of the plurality of PLMNs; and a controller configured to:

select a policy among the plurality of policies based on the PLMN-based selection parameter when there is no user configuration, wherein, when there is a user configuration, the user configuration takes a precedence over the PLMN-based selection parameter, wherein the plurality of PLMNs include a home PLMN (TI-PLMN) and a visited PLMN (V-PLMN), and wherein:

when a policy provided by an ANDSF of the H-PLMN is prioritized, the controller selects the policy by determining whether or not an available WLAN matches a criteria in the WLAN selection rule;

when the available WLAN matches the criteria in the WLAN selection rule, the controller selects the policy by determining to select the policy provided by the ANDSF of the H-PLMN; and when the available WLAN does not match the criteria in the WLAN selection rule, the controller selects the policy by determining to select the policy provided by an ANDSF of the V-PLMN.

8. The terminal of claim 7, wherein the PLMN-based selection parameter is related to whether or not the policy provided by the ANDSF of the H-PLMN is prioritized.

9. The terminal of claim 7, wherein for the selection, the controller is configured to:

determine priorities among the plurality of policies, wherein the selected policy has a highest priority among the priorities of the plurality of policies.

* * * * *